United States Patent Office 3,412,014
Patented Nov. 19, 1968

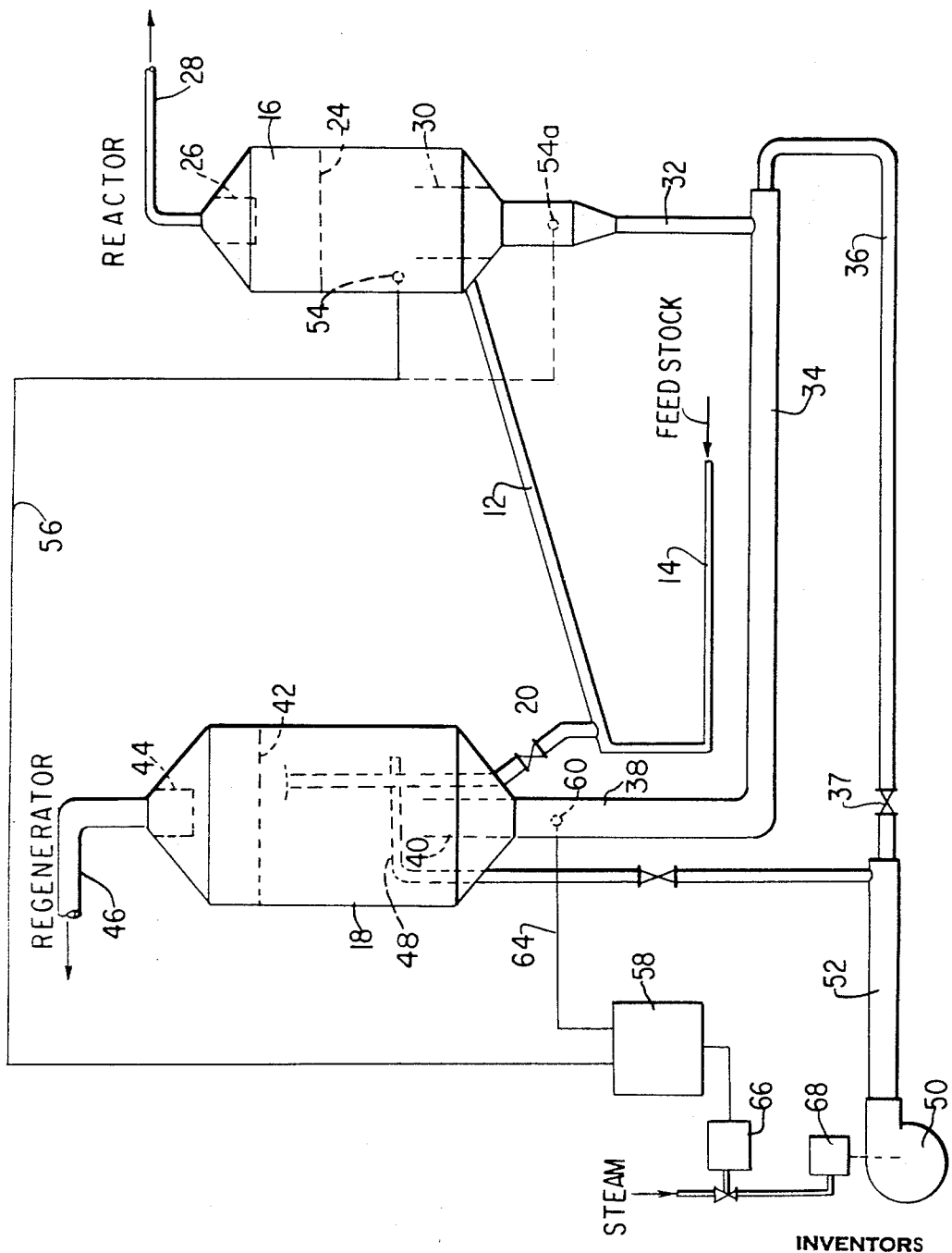

3,412,014
METHOD AND APPARATUS FOR CATALYTIC CRACKER CATALYST REGENERATION
Emory D. Mattix and Richard A. Tharp, Lake Charles, La., assignors to Cities Service Oil Company, Tulsa, Okla., a corporation of Delaware
Filed Mar. 14, 1967, Ser. No. 623,103
10 Claims. (Cl. 208—164)

ABSTRACT OF THE DISCLOSURE

A fluid bed catalytic cracking process for controlling the coke content of regenerated catalyst by varying the supply of combustion supporting gases to the spent catalyst in response to an indication of coke content as obtained from a differential temperature reading across a point at the spent catalyst fluid bed adjacent the stripper in the reactor and a point in the spent catalyst air mixture stream at the inlet to the regenerator.

Background of the invention

This invention relates to process and apparatus for the regeneration of spent catalyst in a fluid catalytic cracking process.

Fluid catalytic cracking systems have been in use since 1942. In these systems the catalyst is a powder, averaging about 50 microns in diameter, which may be fluidized by blowing air or hydrocarbon vapors through the mass, thereby forming a resulting mixture which will flow through pipes and stand in vessels in a manner similar to that of a liquid as long as a passage of gaseous material is maintained. The fluid catalytic cracking process consists of subjecting a feedstock to a (predetermined) temperature and pressure in the presence of the fluidized catalyst and obtaining the desired cracked products thereby. The catalytic cracking reaction takes place in the feed line to the reactor and in the reactor. Since the catalytic cracking reaction is endothermic, it is necessary to supply heat in some way to the reactants. This is accomplished by supplying the regenerated catalyst at a sufficiently high temperature to maintain the reaction. The temperature at which the regenerated catalyst is supplied to the process is dependent upon several factors. Nevertheless the heat required to obtain the desired temperature of the catalyst is supplied by the regeneration reaction itself which is essentially a combustion of the carbonaceous matter commonly referred to as coke which has been deposited on the catalyst during the cracking reaction. Spent catalyst containing coke deposited thereon is removed from the catalytic reactor bed at the stripper and passed through piping and a slide valve into a substantially horizontal line generally under the cracker where it is contacted with air. The air fluidizes the spent catalyst and initiates combustion of the coke on the hot spent catalyst. Ordinarily a fixed amount of air is fed into the spent catalyst feed pipe. This is for purposes of maintaining fluidization of the catalyst and of initiating combustion of the coke.

The spent catalyst and air mixture is then passed into the catalyst regenerator where air is mixed with the catalyst in varying amounts in order to reduce the coke content of the regenerated catalyst to a desirable amount and to obtain a regenerated catalyst having sufficient heat content to maintain the cracking reaction at the reactor. The hot regenerated catalyst is then passed out of the regenerator through a catalyst feed pipe and mixed with incoming fresh feedstock and passed into the cracking reactor.

It is desirable to maintain a coke content of regenerated catalyst below 0.5% by weight, while the preferred range of coke content in the regenerated catalyst is from 0.2 to 0.3% by weight. The presence of a high coke content on regenerated catalyst results in a reduction of the yield and increased deposition of coke on the catalyst in the cracking reaction. An extremely low coke content on the regenerated catalyst results in uncontrolled afterburning, and a dangerously high temperature environment for the cyclones utilized to remove solids from the gases leaving the regenerator.

Generally it has been difficult to achieve the proper control of coke content due to the numerous variables which may effect the amount of coke deposited on the spent catalyst. As indicated, in most catalytic cracking units regenerator input air flow rate is set at a specific value, generally its maximum. Within this limit, other cracking operations are adjusted to obtain that set of conditions which produces the greatest yield without causing the rate of coke deposition on the catalyst to be in excess of the coke burning capacity of the regenerator air. However, this method of operation frequently results in higher than preferred coke deposits on the catalyst during cracking. Several proposed systems utilizing computer controls for efficient control of coke deposition are shown by U.S. Patent No. 3,175,968 issued Mar. 30, 1965 to D. E. Berger and U.S. Patent No. 3,213,014 issued Oct. 19, 1965 to Atkinson and Polin. In the latter patent a great many measured parameters are fed into a computer which in turn is programmed to control several different factors including air flow to the regenerator in order to obtain a desired high yield. Computer control presents certain disadvantages, namely a great deal of capital expenditure required to set up such a system, and the high cost associated with operating such equipment. Additionally, if the parameters selected are not either those critically associated with the process or the program set up for the computer is such that it will not operate efficiently over a wide range of feedstock and conditions, the advantages of using such computer control are somewhat negated. Accordingly, the problem of selecting the proper parameters which are indicative of the operation of the process, and of utilizing these parameters in a system to control the process in order to obtain more efficient yields still exists.

Summary of the invention

We have found that by controlling the amount of air fed into the regenerator in response to an indication of the coke content of the spent catalyst as obtained from a differential temperature reading reflecting the heat released as the spent catalyst is mixed with a fixed amount of air, we are able to control the amount of coke remaining in the regenerated catalyst so as to obtain the best yields from the catalyst cracking process. Apparatus for obtaining such results consist of a temperature sensor located either in the fluid bed of the reactor adjacent the stripper, in the stripper, or in the spent catalyst withdrawal conduit at a point prior to the spent catalyst being contacted with air, and another temperature sensor located in the inlet to the regenerator from the spent catalyst feedline. The aforesaid temperature sensors are used to yield a differential temperature indication which in turn is used to vary the flow of air to the regenerator air distributor rings in order to regenerate catalyst having the desired coke content together with satisfactory regenerated catalyst temperature.

It is therefore an object of this invention to provide a process for varying the flow of air to a regenerator in response to the coke content of spent catalyst.

It is another object of this invention to provide apparatus for obtaining a desired coke content on regenerated catalyst in a fluid bed catalytic cracker.

It is a further object of this invention to automatically control the flow of regenerator air to a regenerator in response to an indicated temperature difference resulting from the combustion of coke on spent catalyst.

Description of the drawing

In order to more fully describe the subject matter of this invention the following drawing is given wherein the:

The drawing is a flow diagram showing the apparatus utilized in a preferred embodiment of this invention.

Description of the preferred embodiment

With reference to the drawing, a catalytic cracking system according to this invention is shown in which fresh feedstock is fed through feedline 12 to a catalytic cracking reactor 16 containing a fluidized bed 24 of cracking catalyst. Regenerated catalyst is fed from a regenerator 18 through regenerated catalyst feedpipe 20 into the feedstock stream in feedline 12 where the catalytic cracking of the feedstock is initiated by contact with the hot regenerated catalyst and continues in the reactor 16, as the catalyst and feedstock pass into the fluidized bed 24. The various hydrocarbon products of the cracking reaction are drawn off through reactor cyclone 26 and outlet pipe 28 for further treatment or storage such as may be desired.

Spent catalyst containing an appreciable amount of adsorbed coke is removed from the reactor through a stripper 30 into a vertical spent catalyst withdrawal conduit 32. The spent catalyst stream passes from the spent catalyst withdrawal conduit 32 to a horizontal spent catalyst carrier line 34 where it is mixed with air from air feedline 36. The air maintains fluidization of the spent catalyst and initiates combustion of the coke adsorbed by the catalyst. A fixed quantity of air as maintained by a flow control regulator 37, is generally mixed with the spent catalyst stream in the carrier line 34 and the resultant combustion of the coke raises the temperature of the spent catalyst stream as it passes through the catalyst carrier line 34, and into a spent catalyst inlet pipe 38, communicating with the spent catalyst carrier line 34. The spent catalyst withdrawal conduit 32, the catalyst carrier line 34, and the inlet pipe 38 to regenerator 18, together form a spent catalyst feed line through which spent catalyst is passed from the reactor 16 to regenerator 18. The fluidized spent catalyst stream passes from the inlet pipe 38 through an outlet 40 into the regenerator fluid bed 42 where it is mixed with varying quantities of combustion supporting gases, preferably air, which react with the coke adsorbed by the catalyst to remove the coke in the form of gases which are drawn from the fluid bed 42 of the regenerator through a cyclone 44 and discharged through a conduit 46.

Air is passed into the regenerator through a set of distributor rings, 48, one of which is shown. The quantity of air mixed with the spent catalyst in the regenerator is a significant factor in determining the quantity of coke which will be removed by combustion from the catalyst and the temperatures of the fluidized regenerated catalyst and the exhaust gases. Excessively high temperature will cause damage to the cyclone 44 and possibly reduce the coke content of the regenerated catalyst to levels below which the cracking reaction would not sustain itself. In contrast, an inadequate quantity of air will result in a high coke content remaining on the regenerated catalyst thereby causing an inefficient cracking reaction, necessitating increased amounts of catalyst and resulting in a greater deposition of coke on the spent catalyst.

Air is therefore supplied in a varying quantity by a blower 50, through conduit 52 to the air distributor rings 48 of the regenerator 18.

A temperature sensor 54 preferably a sensor of the thermocouple type although others such as thermistors may be used, is preferably located at a point adjacent to the catalyst stripper 30 in the catalytic cracker reactor bed 24 although it may also be located at a point 54a in the withdrawal conduit 32, and is connected by a wire or similar conductor 56 to an input point of a differential temperature controller 58 where it serves as the low temperature reference point for said differential temperature controller 58. Another temperature sensor 60, also preferably of the thermocouple type, is located in the spent catalyst inlet pipe 38 to the regenerator. The temperature sensor 60 is connected by a wire conductor 64 to a second terminal of the differential temperature controller 58, thereby providing a high temperature point for the differential temperature controller 58. The differential temperature controller 58 in turn controls a steam flow controller 66 so as to control the steam for the turbine drive 68 of the air blower, thereby varying the supply of air to the air distributor rings 48. The air flow controller 66 is limited to a maximum range setting so as to prevent overspeeding and surging of the turbine and blower. Additionally, the response of the differential controller is set at a low rate as the process lag is appreciable, being on the order of 2 hours.

As the coke content of the spent catalyst increases, the resulting increase in combustion in the spent catalyst carrier line 34 will be indicated by an increase in the differential temperature, thereby causing more air to be provided at the air distributor rings 48. In turn, a decrease in coke content of the spent catalyst will result in less air being fed to the air distributor rings, 48.

In order to more fully describe the present invention, the following example is accordingly presented.

Example

A catalytic cracking system utilizing the improved process of this invention set up in which the aforementioned temperature sensors were thermocouples remotely connected to a Brown Electronic Differential Temperature Controller with pneumatic control, which in turn controlled the Index Set of steam flow controllers. The steam flow controllers in the example were pneumatically set M-40 Foxboro flow controllers with adjustable percent pneumatic setting. The Foxboro flow controllers vary the steam flow to the turbines driving the air blowers, thereby automatically varying the quantity of air supplied to the regenerator air distributor rings. The air flow controllers were limited by the percent range setting knob on the Index Set to a maximum range of 20,000 pounds per hour in order to prevent overspeeding or surging of the air blowers. Additionally, in order to correlate the temperature differential controller operation with that of the rate of the process, the rate of change of the output of the differential temperature controller is set at a slow rate so that it takes up to 2 hours to obtain full (drift correction) controller response to a given differential temperature change.

The following results were obtained in the aforementioned example at a reactor bed temperature of 946° F., and a differential temperature across the aforesaid temperature sensors of about 20° F.;

Coke on catalyst _____percent__ 0.33
Reactor bed temp. _____° F__ 946
Regenerator bed temp. _____° F__ 1152
Fresh feedstock _____b./d. (barrels/day)__ 52,724
Conversion _____ 19,129
Percent yield _____percent__ 36.6

In contrast the process without the use of the controller according to the present invention yielded the following results:

Coke on catalyst _____percent__ 0.59
Reactor bed temp. _____° F__ 946
Regenerator bed temp. _____° F__ 1167
Fresh feedstock _____b./d.__ 52,724
Conversion _____b./d.__ 17,453
Percent yield _____percent__ 33.5

Whereas the prior art as practiced with the fluid bed catalyst cracking system was such that a coke content of about 0.6 percent by weight of the catalyst was regarded as acceptable, the use of the process and apparatus according to this invention permitted about a 0.2 to 0.3 percent decrease in coke adsorbed on to regenerated catalyst to approximately a 0.3 to 0.4 percent level. This has resulted in an increase of regenerator efficiency of at least 20%, and increased the yield of product by about 3%.

Whereupon having fully described my invention and desiring to embrace all modifications and variations as are apparent to those skilled in the art without departing from the scope and spirit of this invention;

We claim:

1. In a fluid bed catalytic process in which the spent catalyst is withdrawn from a reaction zone and passed to a regeneration zone in which it is contacted with combustion supporting gas in order to remove coke from the catalyst by combustion, a process for automatically controlling the coke content of regenerated catalyst which comprises:

contacting spent catalyst withdrawn from the reaction zone with a fixed quantity of combustion supporting gas to thereby initiate combustion of coke on the spent catalyst and increase the temperature of the spent catalyst; and varying the flow of combustion supporting gas to the regeneration zone in response to such increase in the temperature of the spent catalyst.

2. The process of claim 1 in which the increase of temperature of the spent catalyst is determined by measuring a first temperature of the spent catalyst before contacting said catalyst with the fixed quantity of combustion supporting gas, and measuring a second temperature of the spent catalyst following contacting of the spent catalyst with the fixed quantity of combustion supporting gas, but prior to the contacting of the spent catalyst with any additional combustion supporting gas.

3. The process of claim 2 wherein the first temperature is remotely measured in the fluid catalyst bed of the reactor at a point adjacent the spent catalyst outlet.

4. The process of claim 3 wherein the spent catalyst outlet is a spent catalyst stripper.

5. The process of claim 2 wherein the combustion supporting gas is air.

6. The process of claim 5, wherein the first and second temperature measurements are fed to a differential temperature air flow controller.

7. The process of claim 6 wherein the differential temperature air flow controller causes the air flow rate to require a period of two hours for a maximum air flow rate change.

8. In a fluid bed catalytic cracking system having a reactor, a spent catalyst stripper mounted in the reactor, a catalyst regenerator with air supply rings, and a spent catalyst feed line communicating from the stripper to the regenerator, an automatic apparatus for controlling the coke content of regenerated catalyst comprising:

means for introducing a fixed supply of combustion supporting gas into the spent catalyst feed line;

a first temperature sensor mounted for contact with the spent catalyst at a point prior to introduction of the fixed supply of combustion supporting gas;

a second temperature sensor mounted in the spent catalyst feed line at the inlet to the regenerator;

a differential temperature sensing means;

means for transmitting signals from the first and second temperature sensors to the differential temperature sensing means;

means for introducing a variable supply of combustion supporting gas into the regenerator; and means for varying the supply of combustion supporting gas to the regenerator, in response to the differential temperature sensing means, whereby the coke absorbed on the regenerated catalyst is automatically controlled to a low level by the controlled variable supply of combustion supporting gas to the regenerator.

9. The apparatus of claim 8 wherein the first temperature sensor is mounted in the fluid bed of the reactor adjacent the stripper.

10. The apparatus of claim 8 wherein the first temperature sensor is mounted in the spent catalyst feed line at a point prior to the means for introducing the fixed supply of gas.

References Cited

UNITED STATES PATENTS

| | | | |
|---|---|---|---|
| 3,175,968 | 3/1965 | Berger | 208—164 |
| 3,213,014 | 10/1965 | Atkinson et al. | 208—113 |
| 3,316,170 | 4/1967 | Stewart et al. | 208—164 |

DELBERT E. GANTZ, *Primary Examiner.*

HERBERT LEVINE, *Assistant Examiner.*